(12) United States Patent
Gaget et al.

(10) Patent No.: US 7,637,280 B2
(45) Date of Patent: Dec. 29, 2009

(54) DUAL-INLET SELECTIVE FLOW REGULATING VALVE

(75) Inventors: Didier Gaget, Sassenage (FR); Jean Arnault, Saint Nazaire les Eymes (FR)

(73) Assignee: L'Air Liquide - Societe Anonyme a Directoire et Conseil de Surveillance pour l'Etude et l'Exploitation des Procedes George Claude

( * ) Notice: Subject to any disclaimer, the term of this patent is extended or adjusted under 35 U.S.C. 154(b) by 467 days.

(21) Appl. No.: 10/530,086

(22) PCT Filed: Sep. 25, 2003

(86) PCT No.: PCT/FR03/50066

§ 371 (c)(1),
(2), (4) Date: Oct. 31, 2005

(87) PCT Pub. No.: WO2004/031631

PCT Pub. Date: Apr. 15, 2004

(65) Prior Publication Data

US 2006/0118186 A1 Jun. 8, 2006

(30) Foreign Application Priority Data

Oct. 3, 2002 (FR) .................................. 02 12239

(51) Int. Cl.
*F15B 13/043* (2006.01)
(52) U.S. Cl. ............................ 137/625.64; 137/625.66; 137/625.69
(58) Field of Classification Search ............ 137/625.64, 137/625.66, 625.69
See application file for complete search history.

(56) References Cited

U.S. PATENT DOCUMENTS

| 2,167,281 | A | * | 7/1939 | Monroe | 137/625.69 |
| 2,414,451 | A | * | 1/1947 | Christensen | 137/625.69 |
| 2,526,361 | A | * | 10/1950 | Johnson | 137/625.66 |
| 2,553,458 | A | * | 5/1951 | Jordan | 137/625.29 |
| 2,648,313 | A | * | 8/1953 | Clifton | 137/625.68 |
| 2,843,093 | A | * | 7/1958 | Vltavsky | 137/625.64 |
| 3,202,170 | A | * | 8/1965 | Holbrook | 137/269 |

(Continued)

FOREIGN PATENT DOCUMENTS

DE 197 40 392 3/1999

(Continued)

OTHER PUBLICATIONS

International Search Report for PCT/FR03/50066.

(Continued)

*Primary Examiner*—John Rivell
*Assistant Examiner*—Craig Price
(74) *Attorney, Agent, or Firm*—Christopher J. Cronin; Patricia E. McQueeney

(57) ABSTRACT

A fluid distribution and control valve for respiratory gas delivery systems. The valve has a body which is defined by four internal zones. Each zone is connectable to an external fluid circuit and a mobile structure. The mobile structure can move into four positions. The different positions of the mobile structure determine which of the zones are in fluid communication with each other. The valve may also be used to in a pilot's mask to supply oxygen to the pilot from a main source or from a secondary source.

4 Claims, 2 Drawing Sheets

U.S. PATENT DOCUMENTS

| | | | | |
|---|---|---|---|---|
| 3,202,886 | A | * | 8/1965 | Kramer ........................ 335/234 |
| 3,254,675 | A | * | 6/1966 | Johnson ................. 137/625.64 |
| 3,299,906 | A | * | 1/1967 | Smith, Jr. et al. ...... 137/625.69 |
| 3,472,281 | A | * | 10/1969 | Hasegawa et al. ...... 137/625.69 |
| 3,477,344 | A | * | 11/1969 | Fisher ................... 137/625.66 |
| 3,741,237 | A | * | 6/1973 | Browne ................. 137/625.64 |
| 3,756,282 | A | * | 9/1973 | Knutson ................ 137/625.64 |
| 4,176,687 | A | * | 12/1979 | Ensign ................. 137/625.65 |
| 4,187,884 | A | * | 2/1980 | Loveless ............... 137/625.69 |
| 4,501,297 | A | * | 2/1985 | Baker .................... 137/625.46 |
| 4,513,782 | A | * | 4/1985 | Contartese et al. ..... 137/625.64 |
| 4,649,956 | A | * | 3/1987 | Zeuner et al. .......... 137/625.64 |
| 5,261,457 | A | | 11/1993 | Zapata et al. |
| 2004/0211476 | A1 | | 10/2004 | Hager |

FOREIGN PATENT DOCUMENTS

| | | |
|---|---|---|
| EP | 0 499 505 | 8/1992 |
| EP | 1 157 718 | 11/2001 |
| EP | 1 374 972 | 1/2004 |
| GB | 1 022 574 | 3/1996 |
| WO | WO 02 11814 | 2/2002 |

OTHER PUBLICATIONS

Patent Abstracts of Japan, vol. 015, No. 081, Feb. 25, 1991, & JP 02 300573, Dec. 12, 1990.

Patent Abstracts of Japan, vol. 008, No. 040, Feb. 21, 1984, & JP 58 196373, Nov. 15, 1983.

* cited by examiner

DUAL-INLET SELECTIVE FLOW REGULATING VALVE

BACKGROUND

Pilots of modern aircraft, in particular of fighter planes, are supplied with respiratory gas by systems which deliver pure oxygen or an oxygen-enriched mixture.

A control valve of the proportional type with one inlet and two outlets for an onboard system for delivering respiratory gas is described in EP-A-0 499 505 (Zapata et al.).

In current practice, an emergency oxygen source is provided as standard in order to deal with possible failure of the main oxygen source, and a selector element, activated automatically or manually, allows the user to switch the inlet of the control valve to the main source or, if this fails, to the emergency source.

SUMMARY

The present invention relates to fluid distribution and control valves, in particular for an onboard system for delivering respiratory gas to a passenger.

The object of the present invention is to propose a novel architecture of a fluid distribution and control valve combining the function of selection between two sources of fluid and the function of conventional control, using a single mobile structure of greatly simplified and compact arrangement and of increased reliability.

The present invention also relates to an onboard system for delivering respiratory gas to a passenger, the system comprising a valve, and the sources of pressurized fluid typically being a main oxygen source and an emergency oxygen source.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

According to one embodiment of the invention the fluid distribution and control valve comprises a valve body defining four internal zones which are each connectable to an external fluid circuit, and a mobile structure which can be moved into at least four positions in order to selectively establish a fluid communication between two of these zones and to isolate each of the two other zones, a first of these zones being connectable to a user fluid circuit and being able to be selectively brought into communication with each of the three other zones depending on the movement of the mobile structure.

According to other characteristics of the invention, the valve comprises:

a second zone and third zone which are connectable, respectively, to first and second sources of pressurized fluid in order to supply the user fluid circuit sequentially, the mobile structure, typically composed of a slide or rotor sliding or turning, respectively, in partition walls delimiting the different zones, is connected to a positioning servomotor.

In the embodiment shown schematically in the figures, a fluid distribution and control valve according to the invention comprises a valve body 1, whose general configuration is advantageously cylindrical, and in which are formed a multiplicity of zones separated from one another by partition walls provided with through-orifices which can be selectively closed or opened by means of a valve slide designated generally by reference number 2.

Figure 1:
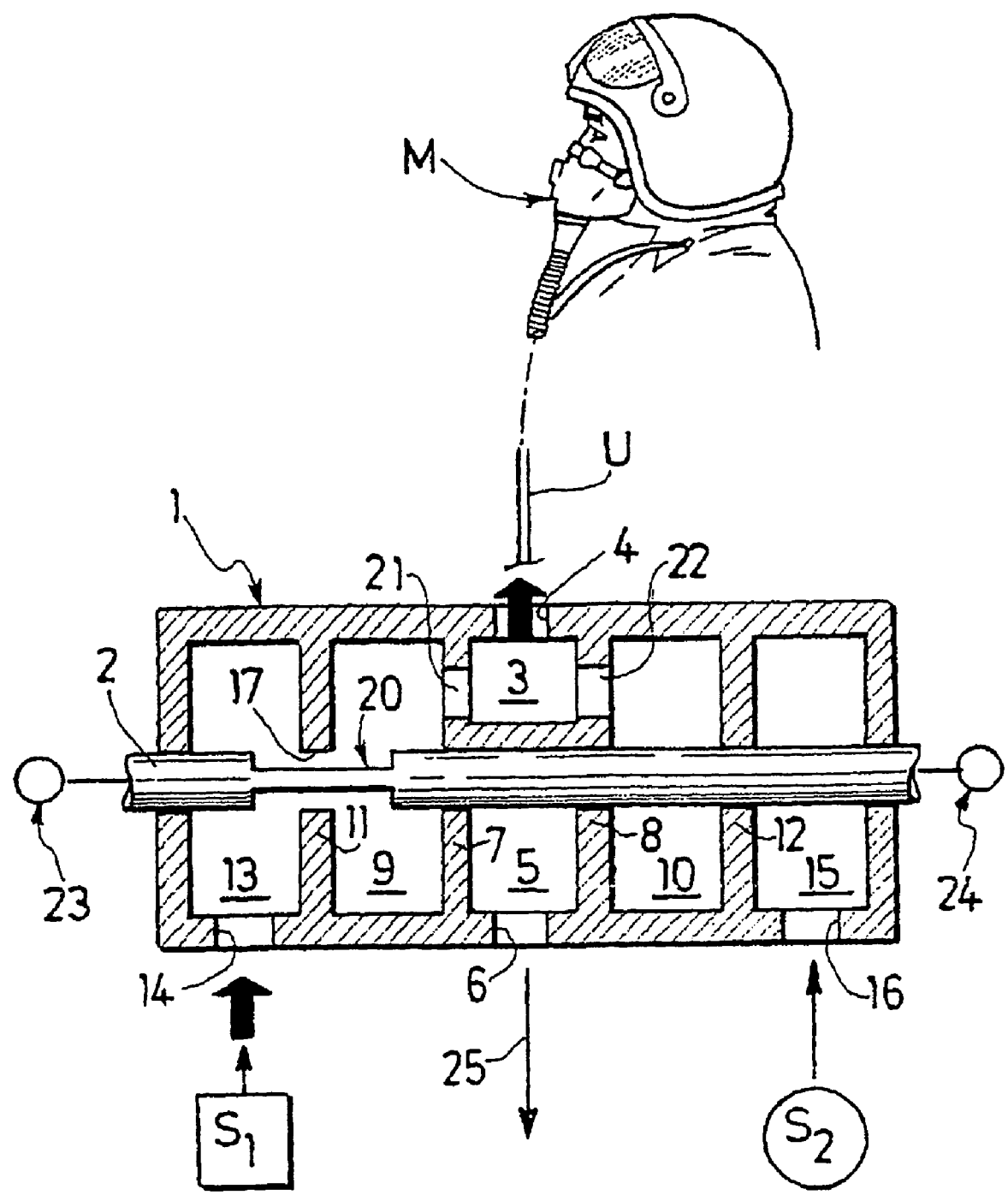
FIG. 1 illustrates a schematic view of one embodiment, according to the current invention, of an onboard respiratory gas delivery system.

More specifically, as is shown in FIG. 1, the valve body 1, whose general configuration is substantially symmetrical with respect to a center plane perpendicular to the axis of the slide 2, comprises, in the center plane and on either side of the slide 2, a first zone 3 provided with a fluid inlet/outlet passage 4 formed in the valve body 1, and a fourth zone 5 provided with a fluid inlet/outlet passage 6 formed in the valve body 1.

The zones 3 and 5 are separated, by partition walls 7 and 8, respectively, from a first intermediate chamber 9 and from a second intermediate chamber 10 which are themselves separated, respectively, by partition walls 11 and 12, from a second zone 13 provided with a fluid inlet/outlet passage 14, and from a third zone 15 provided with a fluid inlet/outlet passage 16.

The partition walls 7, 8, 11, 12 are mutually parallel and in each case comprise a through-opening such as those identified as 17, 18 and 19 in the figures, which through-openings are formed in alignment with one another and in which there slides the slide 2 of cylindrical shape provided locally with a thinner zone (20), advantageously of varying profile, making it possible, depending on the position of the slide, to allow fluid to pass through one of the openings, such as 17 to 19, and to control the flow of fluid thus passing from a zone to a chamber, and vice versa, in the body of the valve.

As can be seen from the figures, in the configuration according to FIG. 1 the slide 2 establishes a communication, via the opening 17, between the second zone 13 and the chamber 9. The zones 5 and 15 and the chamber 10 are each isolated. In the configuration according to FIG. 2, the slide 2 permits communication, via the opening 18, between this intermediate chamber 9 and the fourth zone 5, while the zones 13 and 15 and the chamber 10 are isolated. In the configuration according to FIG. 3, the slide 2 establishes a communication, via the opening 19, between the other intermediate chamber 10 and the third zone 15, while the zones 13 and 5 and the chamber 9 are isolated. In an intermediate configuration (not shown) between the ones in FIGS. 2 and 3, the slide, when symmetrical with respect to FIG. 2, permits communication between the fourth zone 5 and the second intermediate chamber 10 through the opening which is formed in the partition wall 8 and which is traversed by the slide 2.

In the embodiment shown, the first zone 3 is in permanent communication with the intermediate chambers 9 and 10 via openings 21 and 22 formed, respectively, in the partition walls 7 and 8.

Figure 3:
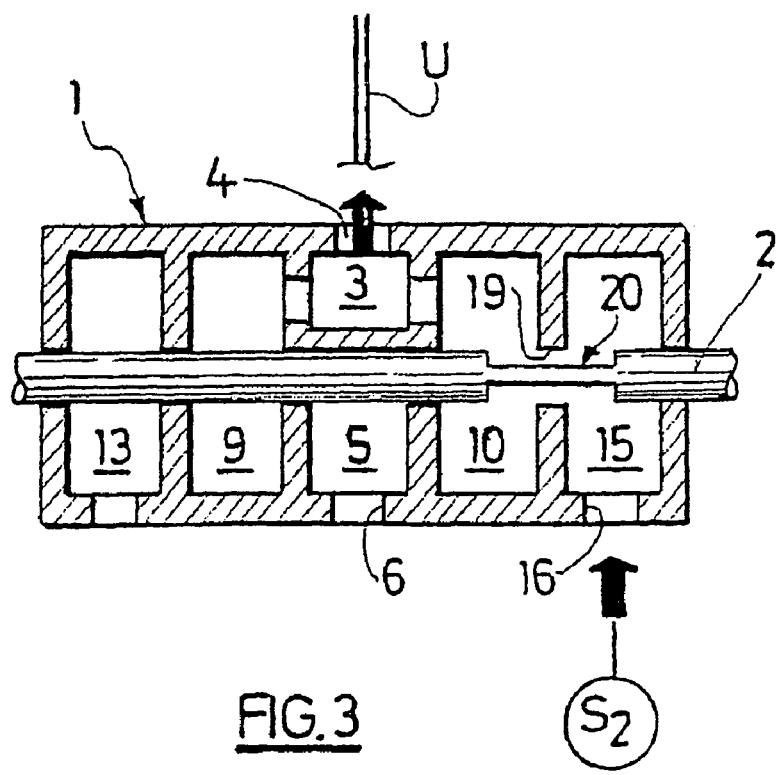
FIG. 3 illustrates a schematic view of a third embodiment, according to the current invention, of the system shown in FIG. 1.

The slide 2 can be continuously positioned, between the end position in FIG. 1 and the end position in FIG. 3, by means of an electric or pneumatic servomotor 23, the position of the slide being detected permanently by a position detector 24 of the electromagnetic or optical type which delivers a precise position control signal to the control unit of the servomotor, thus permitting fine adjustment of the flow of fluid authorized to pass through one of the openings, such as 17.

The function of the valve in its application to an onboard system for delivery of oxygen to an aircraft pilot will now be described.

In such a system, the first zone 3 is connected via the passage 4 to a user circuit U supplying the pilot's mask M. The second zone 13 is connected via the passage 14 to a main source $S_1$ of oxygen, for example an oxygen generator of the adsorption or permeation type, and the fluid passage 16 of the third zone 15 is connected to an emergency source $S_2$ of gaseous or liquid oxygen. The fluid passage 6 of the fourth zone 5 is connected to a vent circuit 25 opening to outside the cockpit.

FIG. 1 shows the configuration for control of a flow of oxygen from the source $S_1$ to the mask M in order to automatically control the respiratory flow required by the user by modulating the passage in the opening 17. In this configuration, the third zone 15 and the second chamber 10 are isolated from the other zones.

Figure 2:
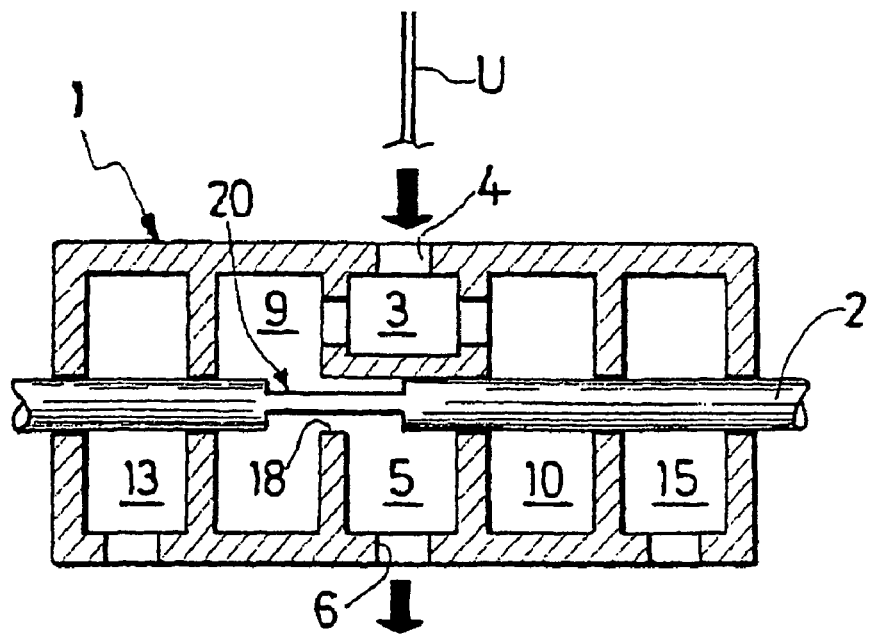
FIG. 2 illustrates a schematic view of second embodiment, according to the current invention, of the system shown in FIG. 1.

FIG. 2 shows the position for venting of the user circuit U by moving the slide 2 from the configuration in FIG. 1, the second zone 13 thus being isolated and the intermediate chamber 9 establishing communication between the first zone 3 and the fourth zone 5 for venting the gaseous mixture from the user circuit to the outside via the passage 6.

FIG. 3 shows the symmetrical configuration of the one in FIG. 1, the user circuit U now being supplied with oxygen from the emergency source $S_2$ via the third zone 15, the control opening 19 in the partition wall 12, the second intermediate chamber 10 and the first zone 3. In this configuration, the second zone 13 and the fifth zone 5 are isolated from the other zones.

Although the present invention has been described with reference to a specific embodiment, it is not limited to the latter and is instead open to modifications and variations which will be obvious to the skilled person from the scope of the claims attached. In particular, the particular structure of the slide 2 and of the cooperating openings such as 17, 18 and 19 can be adapted with varying profiles, and the slide can be replaced by a rotary valve element opening into zones which are spaced angularly apart in the valve body and are separated by radial partition walls.

It will be understood that many additional changes in the details, materials, steps and arrangements of parts which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An onboard system for delivering respiratory gas to a mask connected to a user fluid circuit, comprising:
   a) a user fluid circuit connected to a mask;
   b) a valve body comprising at least first, second, third, and fourth internal zones, wherein:
      said first zone is connected to said user fluid circuit;
      said second zone is connectable to a first pressurized fluid source;
      said third zone is connectable to a second pressurized fluid source;
      said fourth zone is connectable to a vent circuit; and
      said first and said second pressurized fluid sources supply said user fluid circuit sequentially
   c) at least four fluid passages, wherein each said fluid passage connects a corresponding one of said zones to an external fluid circuit, one of the external fluid circuit being said user fluid circuit; and
   d) a mobile structure, wherein:
      1) said mobile structure can be moved into at least four positions;
      2) depending upon said movement of said mobile structure:
         fluid communication is established between at least two of said zones;
         at least two other of said zones are isolated from each other; and
         said first zone is selectively brought into communication with at least one other of said zone;
      3) said mobile structure comprises a slide sliding on partition walls; and
      4) said partition walls define said zones.

2. The apparatus of claim 1, wherein:
   a) said apparatus has an internal layout which is symmetrical with respect to a center plane; and
   b) said center plane is substantially perpendicular to said mobile structure.

3. The apparatus of claim 2, wherein said first zone and said fourth zones are arranged:
   a) about said center plane; and
   b) on either side of said mobile structure.

4. The apparatus of claim 3, further comprising a pair of intermediate chambers, wherein said intermediate chambers are in permanent communication with said first zone.

* * * * *